United States Patent
Takamura et al.

(10) Patent No.: US 11,331,879 B2
(45) Date of Patent: May 17, 2022

(54) INORGANIC BOARD AND METHOD FOR PRODUCING THE SAME

(71) Applicant: Nichiha Corporation, Nagoya (JP)

(72) Inventors: Yasuhiro Takamura, Nagoya (JP); Hiroaki Mizuno, Nagoya (JP)

(73) Assignee: NICHTHA CORPORATION, Nagoya (JP)

( * ) Notice: Subject to any disclaimer, the term of this patent is extended or adjusted under 35 U.S.C. 154(b) by 0 days.

(21) Appl. No.: 16/824,257

(22) Filed: Mar. 19, 2020

(65) Prior Publication Data
US 2020/0215793 A1 Jul. 9, 2020

Related U.S. Application Data

(63) Continuation of application No. PCT/JP2018/033725, filed on Sep. 12, 2018.

(30) Foreign Application Priority Data

Sep. 28, 2017 (JP) .............................. JP2017-188815

(51) Int. Cl.
*B32B 13/12* (2006.01)
*B32B 13/10* (2006.01)
(Continued)

(52) U.S. Cl.
CPC .............. *B32B 13/12* (2013.01); *B32B 13/10* (2013.01); *B32B 27/30* (2013.01); *B32B 21/02* (2013.01);
(Continued)

(58) Field of Classification Search
CPC .......... B32B 13/12; B32B 13/10; B32B 27/30
(Continued)

(56) References Cited

U.S. PATENT DOCUMENTS

| 4,040,851 A | 8/1977 | Ziegler |
| 5,188,889 A | 2/1993 | Nagatomi et al. |

(Continued)

FOREIGN PATENT DOCUMENTS

| CN | 101172827 A | 5/2008 |
| CN | 101550743 A | 10/2009 |

(Continued)

OTHER PUBLICATIONS

Machine_English_translation_JP_05194004_A; Wood Piece Cement Plate; Aug. 3, 1993; EPO; whole document (Year: 1993).*
(Continued)

*Primary Examiner* — Tahseen Khan
(74) *Attorney, Agent, or Firm* — Birch, Stewart, Kolasch & Birch, LLP

(57) ABSTRACT

An object of the present invention is to provide an inorganic board suitable for achieving high specific strength and high freeze-thaw resistance as well as weight reduction and a method for producing the inorganic board. An inorganic board X1 according to the present invention includes a cured layer 11 that includes an inorganic cured matrix, an organic reinforcement material dispersed therein, and a hollow body that is attached to the organic reinforcement material and is smaller than the maximum length of the organic reinforcement material. A method for producing an inorganic board according to the present invention includes a first step of preparing a first mixture through mixing of an organic reinforcement material and a hollow body smaller than the maximum length of the organic reinforcement material, a second step of preparing a second mixture through mixing of the first mixture, a hydraulic material, and a siliceous material, and a third step of forming a second mixture mat by depositing the second mixture.

7 Claims, 1 Drawing Sheet

(51) Int. Cl.
  *B32B 27/30* (2006.01)
  *B32B 21/02* (2006.01)
(52) U.S. Cl.
  CPC ....... *B32B 2307/73* (2013.01); *B32B 2325/00* (2013.01)
(58) Field of Classification Search
  USPC ........................................................ 428/143
  See application file for complete search history.

(56) References Cited

U.S. PATENT DOCUMENTS

| | | | |
|---|---|---|---|
| 5,385,764 A | 1/1995 | Andersen et al. | |
| 5,453,310 A * | 9/1995 | Andersen | B01F 3/1214 428/34.4 |
| 5,508,072 A * | 4/1996 | Andersen | B01F 3/1214 428/34.5 |
| 5,582,670 A | 12/1996 | Andersen et al. | |
| 5,672,310 A * | 9/1997 | Watanabe | B28B 1/525 264/297.4 |
| 6,655,432 B1 * | 12/2003 | Yabe | B29C 63/0065 156/359 |
| 6,779,577 B1 * | 8/2004 | Kaneko | B28B 11/04 156/497 |
| 9,249,053 B2 | 2/2016 | Leung et al. | |
| 2004/0083677 A1 * | 5/2004 | Bezubic, Jr. | E04F 13/141 52/716.1 |
| 2005/0269730 A1 * | 12/2005 | Asakura | C04B 28/04 264/122 |
| 2006/0043627 A1 * | 3/2006 | Sugita | E04C 2/044 264/122 |
| 2006/0147681 A1 * | 7/2006 | Dubey | E04C 2/06 428/192 |
| 2007/0246864 A1 * | 10/2007 | Utagaki | C04B 28/02 264/333 |
| 2008/0072796 A1 * | 3/2008 | Utagaki | C04B 28/04 106/731 |
| 2008/0118735 A1 * | 5/2008 | Kanao | B29C 44/1271 428/294.7 |
| 2008/0176057 A1 | 7/2008 | Ukai | |
| 2008/0199707 A1 * | 8/2008 | Kawai | B32B 18/00 428/428 |
| 2009/0242728 A1 * | 10/2009 | Yamazaki | E04C 2/324 249/16 |
| 2009/0243149 A1 * | 10/2009 | Yamazaki | B29C 43/3697 264/259 |
| 2012/0245254 A1 * | 9/2012 | Shimano | C04B 20/1025 524/8 |
| 2013/0022741 A1 * | 1/2013 | Sakai | C04B 41/52 427/203 |
| 2014/0120342 A1 * | 5/2014 | Imai | E04C 2/04 428/313.5 |

FOREIGN PATENT DOCUMENTS

| | | | | |
|---|---|---|---|---|
| GB | 1517465 A | * | 7/1978 | ............ B32B 3/26 |
| GB | 1517465 B | | 7/1978 | |
| JP | 1-160881 A | | 6/1989 | |
| JP | 3-218955 A | | 9/1991 | |
| JP | 5-194004 A | | 8/1993 | |
| JP | 05194004 A | * | 8/1993 | ............ C04B 28/02 |
| JP | 8-67547 A | | 3/1996 | |
| JP | 9-194245 A | | 7/1997 | |
| JP | 2001-206762 A | | 7/2001 | |
| JP | 2002-68815 A | | 3/2002 | |
| JP | 2002-187759 A | | 7/2002 | |
| JP | 2002-321305 A | | 11/2002 | |
| JP | 2003-320514 A | | 11/2003 | |
| JP | 2004-196601 A | | 7/2004 | |
| WO | WO 1994/12328 A1 | | 6/1994 | |
| WO | WO 2006/073540 A2 | | 7/2006 | |
| WO | WO 2011/060684 A1 | | 5/2011 | |
| WO | WO-2011060684 A1 | * | 5/2011 | ............ C04B 28/04 |

OTHER PUBLICATIONS

Australian Office Action and Search Report for Australian Application No. 2018343769, dated Mar. 24, 2020.
Chinese Office Action (including an English translation thereof) issued in the corresponding Chinese Patent Application No. 201880060984.9 dated Jul. 24, 2020.
Russian Office Action and Search Report (including an English translation thereof) issued in the corresponding Russian Patent Application No. 2020111462/03 dated Aug. 31, 2020.
International Search Report (PCT/ISA/210) issued in PCT/JP2018/033725, dated Nov. 27, 2018.
Extended European Search Report for European Application No. 18862336.7, dated Mar. 17, 2021.

* cited by examiner

INORGANIC BOARD AND METHOD FOR PRODUCING THE SAME

TECHNICAL FIELD

The present invention relates to an inorganic board that can be used, for example, as a building board material and a method for producing the inorganic board.

BACKGROUND ART

Inorganic boards such as fiber reinforced cement siding boards and ceramic boards are sometimes used as wall materials for forming exterior walls and interior walls of buildings. An inorganic board is formed of a raw material composed mainly of a cementitious inorganic material. Techniques related to such an inorganic board are described, for example, in PTLs 1 and 2 listed below.

CITATION LIST

Patent Literature

PTL 1: Japanese Unexamined Patent Application Publication No. 8-67547
PTL 2: Japanese Unexamined Patent Application Publication No. 2002-187759

SUMMARY OF INVENTION

Technical Problem

Wood reinforcement materials such as wood fiber and wood pulp are often used as reinforcement materials for inorganic boards. Incorporation of a wood reinforcement material into an inorganic board helps reinforce an inorganic board to be produced and also contributes to weight reduction (i.e., reduction in specific gravity), and thus helps improve strength (specific strength) expressed as a value obtained by dividing the bending strength of an inorganic board by the specific gravity of the inorganic board. An inorganic board with high specific strength is less prone to breakage during transportation or construction.

On the other hand, an inorganic board after construction will be exposed to the natural environment and may be subjected to a deteriorating action due to the repetition of freezing and thawing, that is, freeze-thaw action, depending on the change in temperature in the environment. Wood reinforcement materials themselves are susceptible to freeze-thaw action. Thus, for the purpose of, for example, improving the property of resisting freeze-thaw action, that is, freeze-thaw resistance, of an inorganic board incorporated with a wood reinforcement material, aggregates of mica or the like are sometimes incorporated into the inorganic board together with the wood reinforcement material.

For such an inorganic board, there is a demand for further weight reduction. This demand is strong because nowadays artisans who handle inorganic boards are getting older and decreasing in number. The present invention has been devised under these circumstances, and an object thereof is to provide an inorganic board suitable for achieving high specific strength and high freeze-thaw resistance as well as weight reduction and a method for producing the inorganic board.

Solution to Problem

According to a first aspect of the present invention, an inorganic board is provided. The inorganic board includes at least one cured layer. The cured layer includes an inorganic cured matrix, an organic reinforcement material dispersed in the inorganic cured matrix, and a hollow body that is attached to the organic reinforcement material and is smaller than a maximum length of the organic reinforcement material.

In this inorganic board or the cured layer thereof, the organic reinforcement material is dispersed in the inorganic cured matrix. Such a configuration is suitable, when an organic reinforcement material having a specific gravity smaller than that of the inorganic cured matrix is employed, for reducing the specific gravity or weight of this inorganic board while reinforcing the inorganic board, and hence suitable for achieving high specific strength of the inorganic board. Along with this, the hollow body which can function as an aggregate in the inorganic cured matrix has a hollow structure, and the presence of such a hollow body in the cured layer contributes to achieving weight reduction and high specific strength of this inorganic board.

In this inorganic board or the cured layer thereof, the hollow body smaller than the maximum length of the organic reinforcement material is attached to the organic reinforcement material dispersed in the inorganic cured matrix. Such a configuration is suitable for suppressing moisture absorption of the organic reinforcement material to increase the resistance to freeze-thaw action, and hence suitable for achieving high freeze-thaw resistance of the cured layer of the inorganic board.

In addition, the above-described hollow body present in a state of being attached to the organic reinforcement material in the inorganic cured matrix is less prone to breakage than a hollow body dispersed separately in the inorganic cured matrix. This is because the organic reinforcement material (larger than the attached hollow body as described above) to which the hollow body is attached tends to exhibit shock absorption by using its elasticity to protect the hollow body.

Therefore, the above configuration in which the hollow body is attached to the organic reinforcement material dispersed in the inorganic cured matrix, the hollow body being smaller than the maximum length of the organic reinforcement material, is suitable for avoiding or reducing breakage of the hollow body in the cured layer of this inorganic board to make the hollow body efficiently produce expected effects such as the weight reduction effect and the freeze-thaw resistance improving effect described above.

As described above, the inorganic board according to the first aspect of the present invention is suitable for achieving high specific strength and high freeze-thaw resistance as well as weight reduction.

In a preferred embodiment of this inorganic board, the organic reinforcement material is coated with a waterproofing agent, and the hollow body is attached to the organic reinforcement material through the waterproofing agent. Such a configuration is preferred for avoiding or suppressing moisture absorption of the organic reinforcement material to achieve high freeze-thaw resistance of the inorganic board. Along with this, this configuration is suitable for achieving a good state of attachment of the hollow body to the organic reinforcement material.

In another preferred embodiment of this inorganic board, the organic reinforcement material and the hollow body attached to the organic reinforcement material are coated with a waterproofing agent. Such a configuration is preferred for avoiding or suppressing moisture absorption of the organic reinforcement material to achieve high freeze-thaw resistance of the inorganic board. Along with this, this configuration is suitable for achieving a good state of attachment of the hollow body to the organic reinforcement material.

The above waterproofing agent preferably contains a synthetic resin. The synthetic resin has coating properties, and thus this configuration is preferred for achieving high freeze-thaw resistance of the inorganic board and for achieving a good state of attachment of the hollow body to the organic reinforcement material.

The inorganic board according to the first aspect of the present invention may have a multilayer structure including the above-described cured layer and an additional cured layer. Alternatively, this inorganic board may have a multilayer structure including two additional cured layers and the above-described cured layer located therebetween. In these cases, the additional cured layer preferably includes an inorganic cured matrix and an organic reinforcement material dispersed in the matrix, and the organic reinforcement material in the additional cured layer is preferably smaller than the organic reinforcement material in the cured layer (i.e., the maximum length of the organic reinforcement material in the additional cured layer is smaller than the maximum length of the organic reinforcement material in the above-described cured layer). More preferably, the additional cured layer includes no hollow body.

Such an additional cured layer is more suitable for providing a dense layer structure than the above-described cured layer. The denser the layer structure is, the higher the water resistance and surface formability of the layer tends to be.

Therefore, the configuration in which this inorganic board has a multilayer structure including such an additional cured layer and the above-described cured layer is suitable for achieving high water resistance and high formability of this inorganic board. The configuration in which this inorganic board has a multilayer structure including two additional cured layers and the above-described cured layer located therebetween is also suitable for achieving high water resistance and high formability of this inorganic board.

Preferably, the organic reinforcement material in the additional cured layer is coated with a waterproofing agent. The waterproofing agent preferably contains a fatty acid (fatty acids have high water resistance). Such a configuration is preferred for avoiding or suppressing moisture absorption of the organic reinforcement material in the above-described additional cured layer, and hence preferred for achieving high water resistance and high freeze-thaw resistance of the inorganic board.

According to a second aspect of the present invention, a method for producing an inorganic board is provided. The method for producing an inorganic board at least includes the following first, second, and third steps.

In the first step, a first mixture is prepared through mixing of an organic reinforcement material and a hollow body smaller than the maximum length of the organic reinforcement material. In the second step, a second mixture is prepared through mixing of the first mixture, a hydraulic material, and a siliceous material. In the third step, a second mixture mat is formed by depositing the second mixture, for example, on a receiver. After the third step, under predetermined temperature conditions and pressure conditions, an inorganic cured matrix can be formed from the hydraulic material and the siliceous material in the second mixture mat while including the organic reinforcement material to which the hollow body is attached, whereby a cured layer of an inorganic board can be formed from the second mixture mat.

In the method for producing an inorganic board according to the second aspect of the present invention, the configuration in which the above first step is performed before the above second step is preferred for achieving a good state of attachment of the hollow body to the organic reinforcement material. Therefore, this method for producing an inorganic board is suitable for producing the above-described inorganic board according to the first aspect of the present invention.

In a preferred embodiment of this method, in the first step, the first mixture is prepared by mixing an organic reinforcement material mixed with a waterproofing agent with a hollow body. The waterproofing agent preferably contains a synthetic resin.

Such a configuration is suitable for achieving the configuration which has been described above in relation to the first aspect of the present invention and in which an organic reinforcement material is coated with a waterproofing agent and a hollow body is attached to the organic reinforcement material through the waterproofing agent. Therefore, this configuration is suitable for achieving a good state of attachment of the hollow body to the organic reinforcement material and is preferred for achieving high freeze-thaw resistance of the inorganic board produced.

In another preferred embodiment of this method, in the first step, the first mixture is prepared by mixing an organic reinforcement material with a hollow body, and then mixing the organic reinforcement material and the hollow body with a waterproofing agent. The waterproofing agent preferably contains a synthetic resin.

Such a configuration is suitable for achieving the configuration which has been described above in relation to the first aspect of the present invention and in which an organic reinforcement material and a hollow body attached to the organic reinforcement material are coated with a waterproofing agent. Therefore, this configuration is suitable for achieving a good state of attachment of the hollow body to the organic reinforcement material and is preferred for achieving high freeze-thaw resistance of the inorganic board produced.

The method for producing an inorganic board according to the second aspect of the present invention may further include a fourth step of preparing a third mixture for forming an additional cured layer through mixing of a hydraulic material, a siliceous material, and an organic reinforcement material, and at least one fifth step of forming a third mixture mat by depositing the third mixture.

In this case, preferably, the organic reinforcement material in the third mixture is smaller than the organic reinforcement material in the above-described second mixture (i.e., the maximum length of the organic reinforcement material in the third mixture is smaller than the maximum length of the organic reinforcement material in the second mixture). In addition, preferably, the fifth step is performed after the third step to form a third mixture mat on a second mixture mat; the third step is performed after the fifth step to form a second mixture mat on a third mixture mat; or the third step is performed after the fifth step to form a second mixture mat on a third mixture mat, and the fifth step is further performed to form another third mixture mat on the second mixture mat.

After the stacking of the mixture mats, an inorganic cured matrix can be formed from the hydraulic material and the siliceous material in each mixture mat under predetermined temperature conditions and pressure conditions, whereby the above-described cured layer can be formed from the second mixture mat, and the above-described additional cured layer can be formed from the third mixture mat.

With the above configuration including the fourth and fifth steps, the above-described inorganic board having a multilayer structure including a cured layer and an additional cured layer or the above-described inorganic board having a multilayer structure including two additional cured layers and a cured layer located therebetween can be appropriately produced.

Preferably, in the fourth step, the third mixture is prepared by mixing an organic reinforcement material mixed with a waterproofing agent with a hydraulic material and a siliceous material. The waterproofing agent preferably contains a fatty acid. Such a configuration is preferred for avoiding or suppressing moisture absorption of the organic reinforcement material in the additional cured layer formed, and hence preferred for achieving high water resistance and high freeze-thaw resistance of the inorganic board produced.

DESCRIPTION OF EMBODIMENTS

Figure 1:
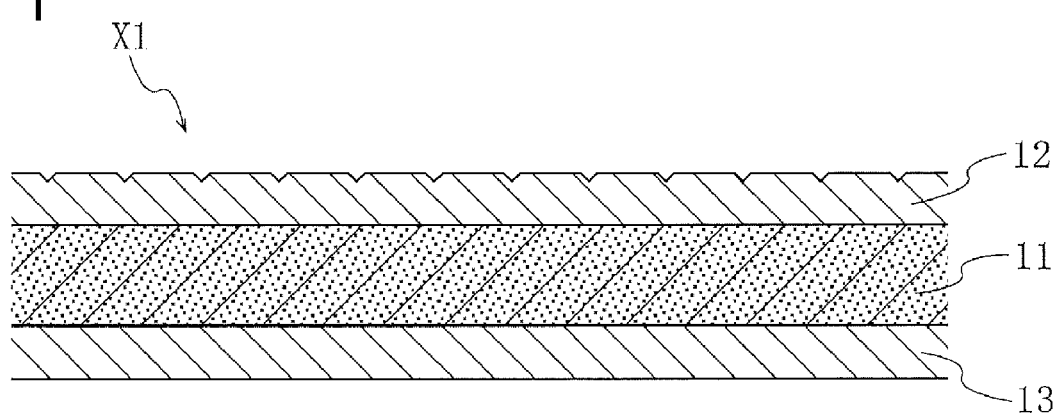
FIG. 1 is a partial sectional view of an inorganic board according to a first embodiment of the present invention.

FIG. 1 is a partial sectional view of an inorganic board X1 according to a first embodiment of the present invention. The inorganic board X1 has a multilayer structure including a cured layer 11, a cured layer 12, and a cured layer 13, and can be used, for example, as a wall material for forming an exterior wall or an interior wall of a building.

In this embodiment, the cured layer 11 is a core layer and includes an inorganic cured matrix, an organic reinforcement material dispersed in the inorganic cured matrix, and a hollow body that is attached to the organic reinforcement material and is smaller than the maximum length of the organic reinforcement material.

Examples of the inorganic cured matrix in the cured layer 11 include cured materials formed of hydraulic materials and cured materials formed of hydraulic materials and siliceous materials.

Examples of hydraulic materials include cements, gypsums, and slags. Examples of cements include ordinary Portland cement, high-early-strength Portland cement, alumina cement, blast-furnace cement, and fly-ash cement. Examples of gypsums include anhydrous gypsum, hemihydrate gypsum, and dihydrate gypsum. Examples of slags include blast-furnace slag and converter slag.

To form the inorganic cured matrix in the cured layer 11, one hydraulic material may be used, or two or more hydraulic materials may be used. The Blaine specific surface area of such a hydraulic material is, for example, 2000 to 10000 $cm^2/g$.

Examples of siliceous materials include silica sand, quartzite powder, silica powder, coal ash, fly ash, and diatomaceous earth. To form the inorganic cured matrix in the cured layer 11, one siliceous material may be used, or two or more siliceous materials may be used. The Blaine specific surface area of such a siliceous material is, for example, 3000 to 30000 $cm^2/g$.

When a cured material formed of a hydraulic material and a siliceous material is employed as the inorganic cured matrix in the cured layer 11, the mass ratio of the hydraulic material to the siliceous material in a raw material mixture for forming the cured layer 11 is preferably 6:4 to 3:7.

Examples of the organic reinforcement material in the cured layer 11 include plant-based reinforcement materials and synthetic fibers. Examples of plant-based reinforcement materials include wood flour, wood wool, wood chips, wood pulp, wood fiber, wood fiber bundles, wastepaper, bamboo pulp, hemp fiber, bagasse, chaff, and rice straw. Examples of synthetic fibers include polyester fiber, polyamide fiber, polyethylene fiber, polypropylene fiber, and acrylic fiber. In the cured layer 11, one organic reinforcement material may be used, or two or more organic reinforcement materials may be used.

When wood flour is used as the organic reinforcement material, the wood flour has a size of, for example, 20 to 50 mesh. When wood chips are used as the organic reinforcement material, the wood chips have a width of, for example, 0.5 to 2 mm, a length of, for example, 1 to 20 mm, and an aspect ratio (length/width) of, for example, 20 to 30.

When a wood fiber bundle is used as the organic reinforcement material, the wood fiber bundle has a diameter of, for example, 0.1 to 2 mm and a length of, for example, 2 to 35 mm. The wood fiber bundle may have a branched shape, a curved shape, or a bent shape.

As described above, the hollow body in the cured layer 11 is attached to the organic reinforcement material and is smaller than the maximum length of the organic reinforcement material. For example, when the organic reinforcement material is in the form of powder or small pieces, the maximum length of the organic reinforcement material means the longest diameter thereof, and when the organic reinforcement material is in the form of organic fibers, the maximum length of the organic reinforcement material means the fiber length thereof. The length of the hollow body attached to such an organic reinforcement material is smaller than the maximum length of the organic reinforcement material.

The hollow body in the cured layer 11 has one shell or two or more connected shells with an inner cavity. The shell of the hollow body is preferably, but not necessarily, closed. The hollow body may be a porous body. Preferably, the shape of the hollow body is substantially spherical, for example, spherical or oval.

Examples of the hollow body include expanded polystyrene beads, microspheres, pearlite, fly ash balloons, Shirasu balloons, expanded shale, expanded clay, and calcined diatomaceous earth. The microspheres are preferably made of acrylic foam. In the cured layer 11, one hollow body may be used, or two or more hollow bodies may be used.

The hollow body preferably has a median size (diameter D50) of 0.05 to 2 mm. When expanded polystyrene beads are used as the hollow body, the median size of the expanded polystyrene beads is preferably 0.5 to 2 mm, more preferably 0.8 to 1.5 mm. When microspheres are used as the hollow body, the median size of the microspheres is preferably 0.05 to 0.3 mm, more preferably 0.08 to 0.2 mm. When pearlite is used as the hollow body, the median size of the pearlite is preferably 0.1 to 1 mm, more preferably 0.1 to 0.5 mm.

In a preferred embodiment, the organic reinforcement material in the cured layer 11 is coated with a waterproofing agent, and the hollow body is attached to the organic reinforcement material through the waterproofing agent. In another preferred embodiment, the organic reinforcement material in the cured layer 11 and the hollow body attached thereto are coated with a waterproofing agent.

Examples of waterproofing agents include wax, paraffin, succinic acid, fatty acids, silicone, and synthetic resins. Examples of synthetic resins include acrylic resins, polyethylene, ethylene-vinyl acetate copolymers, urethane resins, and epoxy resins. Synthetic resins, which have high coating properties, are suitable as the waterproofing agent in the cured layer 11.

In this embodiment, the cured layer 12 (additional cured layer) is a front layer that serves as a design surface of the inorganic board X1. The cured layer 12 includes an inorganic cured matrix and an organic reinforcement material dispersed in the inorganic cured matrix.

Examples of the inorganic cured matrix in the cured layer 12 include cured materials formed of hydraulic materials and cured materials formed of hydraulic materials and siliceous materials. Examples of hydraulic materials for the cured layer 12 and the Blaine specific surface area thereof are the same as the examples of hydraulic materials for the cured layer 11 and the Blaine specific surface area thereof described above. Examples of siliceous materials for the cured layer 12 and the Blaine specific surface area thereof are the same as the examples of siliceous materials for the cured layer 11 and the Blaine specific surface area thereof described above.

When a cured material formed of a hydraulic material and a siliceous material is employed as the inorganic cured matrix in the cured layer 12, the mass ratio of the hydraulic material to the siliceous material in a raw material mixture for forming the cured layer 12 is preferably 6:4 to 4:6.

Examples of the organic reinforcement material in the cured layer 12 include plant-based reinforcement materials and synthetic fibers. In this embodiment, the organic reinforcement material in the cured layer 12 is smaller than the above-described organic reinforcement material in the cured layer 11 (i.e., the maximum length of the organic reinforcement material in the cured layer 12 is smaller than the maximum length of the organic reinforcement material in the cured layer 11).

Examples of organic reinforcement materials for the cured layer 12 are the same as the examples of organic reinforcement materials for the cured layer 11 described above. The size of the organic reinforcement materials for the cured layer 12, insofar as it is smaller than the organic reinforcement materials for the cured layer 11, is the same as the size of the organic reinforcement materials for the cured layer 11 described above.

The organic reinforcement material in the cured layer 12 is preferably coated with a waterproofing agent. Examples of waterproofing agents include wax, paraffin, succinic acid, fatty acids, silicone, and synthetic resins. The waterproofing agent in the cured layer 12 is preferably a fatty acid. Fatty acids, which have high water resistance, are suitable as the waterproofing agent. Examples of fatty acids include higher fatty acids such as linoleic acid and oleic acid.

In this embodiment, the cured layer 12 does not include the hollow body described above as a constituent material of the cured layer 11.

In this embodiment, the cured layer 13 (additional cured layer) is a back layer opposite to the design surface of the inorganic board X1. The cured layer 13 includes an inorganic cured matrix and an organic reinforcement material dispersed in the inorganic cured matrix.

Examples of the inorganic cured matrix in the cured layer 13 include cured materials formed of hydraulic materials and cured materials formed of hydraulic materials and siliceous materials. Examples of hydraulic materials for the cured layer 13 and the Blaine specific surface area thereof are the same as the examples of hydraulic materials for the cured layer 11 and the Blaine specific surface area thereof described above. Examples of siliceous materials for the cured layer 13 and the Blaine specific surface area thereof are the same as the examples of siliceous materials for the cured layer 11 and the Blaine specific surface area thereof described above.

When a cured material formed of a hydraulic material and a siliceous material is employed as the inorganic cured matrix in the cured layer 13, the mass ratio of the hydraulic material to the siliceous material in a raw material mixture for forming the cured layer 13 is preferably 6:4 to 4:6.

Examples of the organic reinforcement material in the cured layer 13 include plant-based reinforcement materials and synthetic fibers. In this embodiment, the organic reinforcement material in the cured layer 13 is smaller than the above-described organic reinforcement material in the cured layer 11 (i.e., the maximum length of the organic reinforcement material in the cured layer 13 is smaller than the maximum length of the organic reinforcement material in the cured layer 11).

Examples of organic reinforcement materials for the cured layer 13 are the same as the examples of organic reinforcement materials for the cured layer 11 described above. The size of the organic reinforcement materials for the cured layer 13, insofar as it is smaller than the organic reinforcement materials for the cured layer 11, is the same as the size of the organic reinforcement materials for the cured layer 11 described above.

The organic reinforcement material in the cured layer 13 is preferably coated with a waterproofing agent. Examples of waterproofing agents include wax, paraffin, succinic acid, fatty acids, silicone, and synthetic resins. The waterproofing agent in the cured layer 13 is preferably a fatty acid. Fatty acids, which have high water resistance, are suitable as the waterproofing agent. Examples of fatty acids include higher fatty acids such as linoleic acid and oleic acid.

In this embodiment, the cured layer 13 does not include the hollow body described above as a constituent material of the cured layer 11.

The cured layers 11, 12, and 13 may each contain other materials in addition to the constituent materials described above. Examples of other materials include admixtures. Examples of admixtures include mica, papermaking sludge incineration ash, silica fumes, wollastonite, calcium carbonate, magnesium hydroxide, aluminium hydroxide, vermiculite, sepiolite, xonotlite, kaolinite, zeolite, and pulverized inorganic board.

The mica is preferably a flaky mica having an average particle size of 200 to 700 μm and an aspect ratio of 60 to 100.

Examples of pulverized inorganic board include pulverized products of defective uncured inorganic boards and defective cured inorganic boards yielded during the process for producing inorganic boards and pulverized products of inorganic board remnants and wastes yielded, for example, in building sites. The average particle size of these pulverized products is, for example, 50 to 150 μm.

Each of the layers of the inorganic board X1 having a configuration as described above can be formed by a dry method or a wet method.

In the dry method, a raw material mixture containing constituent materials of a cured layer to be formed is scattered onto a receiver to form a mixture mat. The raw material mixture may contain water. When the raw material mixture contains water, the water content of the raw material mixture is about 30 to 45 parts by mass based on 100 parts by mass of the solid content of the constituent materials of the cured layer. The mixture mat formed will form a cured layer through a curing process under predetermined pressure conditions and temperature conditions and optional autoclave curing.

In the wet method, a slurry prepared by kneading constituent materials of a cured layer to be formed and water is flowed over a porous body such as felt and subjected to papermaking dehydration to form a mixture mat. The mixture mat will form a cured layer through a curing process under predetermined pressure conditions and temperature conditions and optional autoclave curing.

Specifically, the inorganic board X1 described above can be produced, for example, through the following process.

First, a mixture for forming the cured layer 11, a mixture for forming the cured layer 12, and a mixture for forming the cured layer 13 are each produced.

In producing the mixture for forming the cured layer 11, first, a first mixture is prepared through mixing of the above-described organic reinforcement material for the cured layer 11 and the above-described hollow body for the cured layer 11. Thereafter, a second mixture is prepared through mixing of the first mixture, the above-described hydraulic material for the cured layer 11, and the above-described siliceous material for the cured layer 11. The configuration in which mixing of an organic reinforcement material with a hollow body is performed before mixing of the organic reinforcement material with a hydraulic material and a siliceous material is preferred for achieving a good state of attachment of the hollow body to the organic reinforcement material.

In producing the mixture for forming the cured layer 11, the first mixture is preferably prepared by mixing an organic reinforcement material mixed with the above-described waterproofing agent for the cured layer 11 with a hollow body. Such a configuration is suitable for achieving the preferred embodiment which has been described above in relation to the inorganic board X1 and in which an organic reinforcement material is coated with a waterproofing agent and a hollow body is attached to the organic reinforcement material through the waterproofing agent.

Alternatively, in producing the mixture for forming the cured layer 11, the first mixture may be prepared by mixing an organic reinforcement material with a hollow body and then mixing the organic reinforcement material and the hollow body with the above-described waterproofing agent for the cured layer 11. Such a configuration is suitable for achieving the preferred embodiment which has been described above in relation to the inorganic board X1 and in which an organic reinforcement material and a hollow body attached to the organic reinforcement material are coated with a waterproofing agent.

The mixture for forming the cured layer 12 is prepared through mixing of the above-described hydraulic material, the above-described siliceous material, and the above-described organic reinforcement material for forming the cured layer 12. In producing the mixture for forming the cured layer 12, preferably, an organic reinforcement material mixed with the above-described waterproofing agent for the cured layer 12 is mixed with a hydraulic material and a siliceous material. Such a configuration is preferred for avoiding or suppressing moisture absorption of the organic reinforcement material in the cured layer 12 formed.

The mixture for forming the cured layer 13 is prepared through mixing of the above-described hydraulic material, the above-described siliceous material, and the above-described organic reinforcement material for forming the cured layer 13. In producing the mixture for forming the cured layer 13, preferably, an organic reinforcement material mixed with the above-described waterproofing agent for the cured layer 13 is mixed with a hydraulic material and a siliceous material. Such a configuration is preferred for avoiding or suppressing moisture absorption of the organic reinforcement material in the cured layer 13 formed.

In producing the inorganic board X1, the mixture for forming the cured layer 12 is then deposited on a receiver by scattering to form a mixture mat for forming the cured layer 12. In this embodiment, the receiver is a template having on its inner surface (a surface that receives the mixture for forming the cured layer 12) an irregular shape corresponding to a design surface of the inorganic board X1 to be produced.

Next, the mixture for forming the cured layer 11 is deposited on the mixture mat for forming the cured layer 12 by scattering to form a mixture mat for forming the cured layer 11.

Next, the mixture for forming the cured layer 13 is deposited on the mixture mat for forming the cured layer 11 by scattering to form a mixture mat for forming the cured layer 13.

Next, the mixture mats stacked as described above are cured by heating in a pressed state. Specifically, an inorganic cured matrix is formed from the hydraulic material and the siliceous material in each mixture mat. In this step, the pressure is, for example, 2 to 8 MPa, the heating temperature is, for example, 50° C. to 80° C., and the pressing time is 6 to 12 hours.

After this, autoclave curing is performed as required. In this autoclave curing, the temperature is, for example, 150° C. or more, and the pressure is, for example, 0.5 MPa or more.

For example, the inorganic board X1 can be appropriately produced as described above.

As described above, in the inorganic board X1 or the cured layer 11, which is a core layer of the inorganic board X1, the organic reinforcement material is dispersed in the inorganic cured matrix. Such a configuration is suitable, when an organic reinforcement material having a specific gravity smaller than that of the inorganic cured matrix is employed, for reducing the specific gravity or weight of the inorganic board X1 while reinforcing the inorganic board X1, and hence suitable for achieving high specific strength (a value obtained by dividing a bending strength by a specific gravity) of the inorganic board X1.

Along with this, the hollow body which can function as an aggregate in the inorganic cured matrix has a hollow structure, and the presence of such a hollow body in the cured layer 11 contributes to achieving weight reduction and high specific strength of the inorganic board X1.

In the inorganic board X1 or the cured layer 11 thereof, the hollow body is attached to the organic reinforcement material dispersed in the inorganic cured matrix, as described above. Such a configuration is suitable for suppressing moisture absorption of the organic reinforcement material to increase the resistance to freeze-thaw action, and hence suitable for achieving high freeze-thaw resistance of the inorganic board X1 or the cured layer 11 thereof.

In addition, the above-described hollow body present in a state of being attached to the organic reinforcement material in the inorganic cured matrix is less prone to breakage than a hollow body dispersed separately in the inorganic cured matrix. This is because the organic reinforcement material (larger than the attached hollow body as described above) to which the hollow body is attached tends to exhibit shock absorption by using its elasticity to protect the hollow body.

Therefore, the above configuration in which the hollow body is attached to the organic reinforcement material dispersed in the inorganic cured matrix, the hollow body being smaller than the maximum length of the organic reinforcement material, is suitable for avoiding or reducing breakage of the hollow body in the cured layer 11 of the inorganic board X1 to make the hollow body efficiently produce expected effects such as the weight reduction effect and the freeze-thaw resistance improving effect.

As described above, the inorganic board X1 is suitable for achieving high specific strength and high freeze-thaw resistance as well as weight reduction.

As described above, in one preferred embodiment of the inorganic board X1, the organic reinforcement material in the cured layer 11 is coated with a waterproofing agent, and the hollow body is attached to the organic reinforcement material through the waterproofing agent. Such a configuration is preferred for avoiding or suppressing moisture absorption of the organic reinforcement material in the cured layer 11 to achieve high freeze-thaw resistance of the inorganic board X1. Along with this, this configuration is suitable for achieving a good state of attachment of the hollow body to the organic reinforcement material in the cured layer 11.

As described above, in another preferred embodiment of the inorganic board X1, the organic reinforcement material in the cured layer 11 and the hollow body attached to the organic reinforcement material are coated with a waterproofing agent. Such a configuration is preferred for avoiding or suppressing moisture absorption of the organic reinforcement material in the cured layer 11 to achieve high freeze-thaw resistance of the inorganic board X1. Along with this, this configuration is suitable for achieving a good state of attachment of the hollow body to the organic reinforcement material in the cured layer 11.

When a waterproofing agent is used in the cured layer 11, the waterproofing agent preferably contains a synthetic resin as described above. The synthetic resin has coating properties, and thus this configuration is preferred for achieving high freeze-thaw resistance of the inorganic board X1 and for achieving a good state of attachment of the hollow body to the organic reinforcement material in the cured layer 11.

In the inorganic board X1, the organic reinforcement material in the cured layer 12 is smaller than the organic reinforcement material in the cured layer 11 as described above, and the cured layer 12 includes no hollow body in this embodiment. This configuration is suitable for making the layer structure of the cured layer 12 denser than the layer structure of the cured layer 11. The denser the layer structure is, the higher the water resistance and surface formability of the layer tends to be. Therefore, the configuration in which the inorganic board X1 includes the cured layer 12 (front layer) in addition to the cured layer 11 (core layer) is suitable for achieving high water resistance and high formability on the cured layer 12 side of the inorganic board X1.

In the inorganic board X1, the organic reinforcement material in the cured layer 12 is coated with a waterproofing agent as described above, and the waterproofing agent is preferably a fatty acid. Such a configuration is preferred for avoiding or suppressing moisture absorption of the organic reinforcement material in the cured layer 12, and hence preferred for achieving high water resistance and high freeze-thaw resistance of the inorganic board X1.

In the inorganic board X1, the organic reinforcement material in the cured layer 13 is smaller than the organic reinforcement material in the cured layer 11 as described above, and the cured layer 13 includes no hollow body in this embodiment. Such a configuration is suitable for making the layer structure of the cured layer 13 denser than the layer structure of the cured layer 11. The denser the layer structure is, the higher the water resistance and surface formability of the layer tends to be. Therefore, the configuration in which the inorganic board X1 includes the cured layer 13 (back layer) in addition to the cured layer 11 (core layer) is suitable for achieving high water resistance and other properties on the cured layer 13 side of the inorganic board X1.

In the inorganic board X1, the organic reinforcement material in the cured layer 13 is coated with a waterproofing agent as described above, and the waterproofing agent is preferably a fatty acid. Such a configuration is preferred for avoiding or suppressing moisture absorption of the organic reinforcement material in the cured layer 13, and hence preferred for achieving high water resistance and high freeze-thaw resistance of the inorganic board X1.

Figure 2:
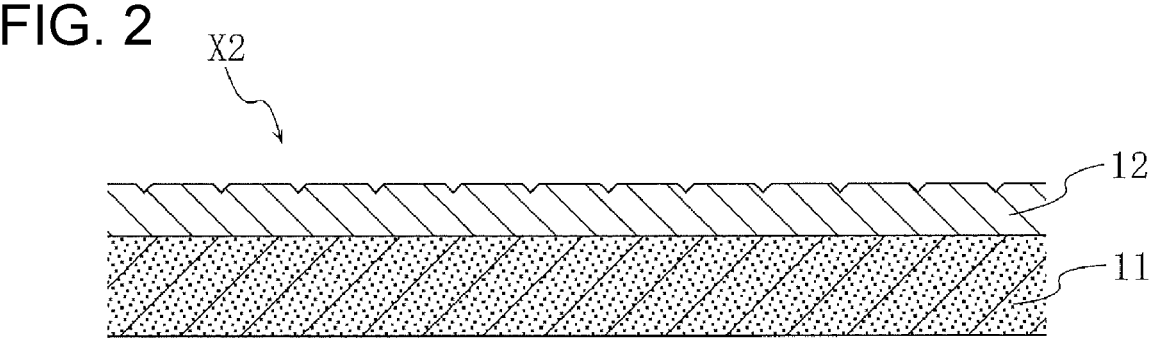
FIG. 2 is a partial sectional view of an inorganic board according to a second embodiment of the present invention.

FIG. 2 is a partial sectional view of an inorganic board X2 according to a second embodiment of the present invention. The inorganic board X2 has a multilayer structure including the cured layer 11 serving as a core layer and the cured layer 12 serving as a front layer, and has the same configuration as that of the inorganic board X1 except that the multilayer structure does not include the cured layer 13.

The inorganic board X2 having such a configuration can be produced, for example, in the same manner as the method for producing the inorganic board X1 except that in the process for forming a stack of mixture mats, the step of forming a mixture mat for forming the cured layer 13 on a mixture mat for forming the cured layer 11 is not performed.

The inorganic board X2 as described above also produces the effect described above in relation to the inorganic board X1 as the effect of including the cured layer 11, and produces the effect described above in relation to the inorganic board X1 as the effect of including the cured layer 12.

The inorganic board X2 can be applied, for example, to a board material that is used while being bonded to a different member through an adhesive applied to a back surface of the board material (corresponding to a surface of the cured layer 11 opposite to the cured layer 12).

Figure 3:
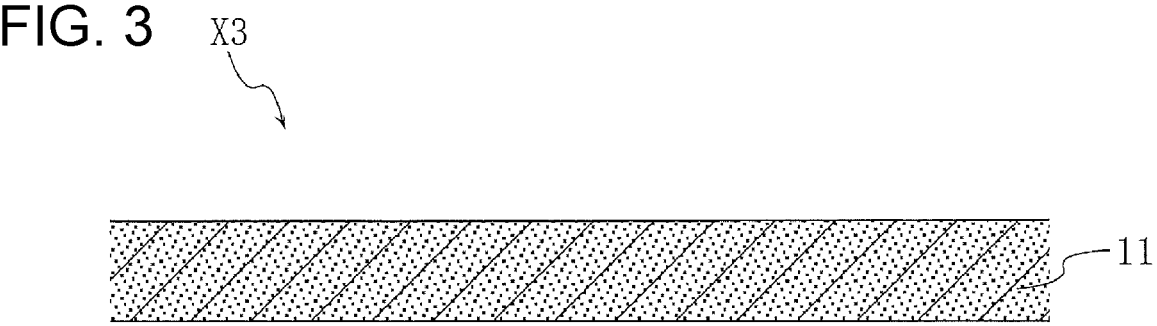
FIG. 3 is a partial sectional view of an inorganic board according to a third embodiment of the present invention.

FIG. 3 is a partial sectional view of an inorganic board X3 according to a third embodiment of the present invention. The inorganic board X3 includes the cured layer 11 serving as a core layer and has the same configuration as that of the inorganic board X1 except that the layer structure does not include the cured layers 12 and 13.

The inorganic board X3 having such a configuration can be produced, for example, in the same manner as the method for producing the inorganic board X1 except that in the process for forming a stack of mixture mats, the step of forming a mixture mat for forming the cured layer 12 on a receiver and the step of forming a mixture mat for forming the cured layer 13 on a mixture mat for forming the cured layer 11 are not performed.

The inorganic board X3 as described above also produces the effect described above in relation to the inorganic board X1 as the effect of including the cured layer 11.

The inorganic board X3 can be applied, for example, to a fireproof roof board or a substrate material.

EXAMPLES

Inorganic boards according to Samples 1 to 10 were produced, and each inorganic board was examined for specific gravity, specific strength, freeze-thaw resistance, dimensional stability, and burning shrinkage. Solids compositions of raw materials for forming layers of the inorganic boards according to Samples 1 to 10 are as shown in Tables 1 and 2. In Tables 1 and 2, the unit of values representing the compositions is relative "part by mass" in each raw material.

Sample 1

First, a first raw material mixture for a core layer and a second raw material mixture for a front layer and a back layer were produced.

In producing the first raw material mixture, wood chips (each having a maximum length of 20 mm or less) serving as organic reinforcement materials and expanded polystyrene beads (having a particle size D50 of 1.0 mm) serving as hollow bodies were first mixed together. Next, the mixture thus obtained and an acrylic resin serving as a waterproofing agent were mixed together. Next, the mixture thus obtained and water were mixed together. Next, the mixture thus obtained, high-early-strength cement serving as a hydraulic material, fly ash serving as a siliceous material, and mica and pulverized inorganic board remnants serving as admixtures were mixed together.

In this manner, the first raw material mixture for a core layer was produced. In the first raw material mixture, the amount of water is 40 parts by mass based on 100 parts by mass of the solid content.

In producing the second raw material mixture, wood chips (each having a maximum length of 12 mm or less) serving as organic reinforcement materials and a higher fatty acid serving as a waterproofing agent were first mixed together. Next, the mixture thus obtained and water were mixed together. Next, the mixture thus obtained, high-early-strength cement serving as a hydraulic material, fly ash serving as a siliceous material, and mica and pulverized inorganic board remnants serving as admixtures were mixed together. These high-early-strength cement, fly ash, mica, and pulverized inorganic board remnants are the same as those used for the first raw material mixture.

In this manner, the second raw material mixture for a front layer and a back layer was produced. In the second raw material mixture, the amount of water is 40 parts by mass based on 100 parts by mass of the solid content.

In producing the inorganic board of Sample 1, the second raw material mixture was then deposited on a template by scattering to form a mixture mat for forming a front layer. Next, the first raw material mixture was deposited on the mixture mat by scattering to form a mixture mat for forming a core layer. Next, the second raw material mixture was deposited on the mixture mat for a core layer by scattering to form a mixture mat for forming a back layer.

Next, the stack of the mixture mats was subjected to a stack pressing process at a pressure of 3 MPa, and while being in this pressed state, the stack was subjected to a steam curing process at a temperature of 60° C. for 6 hours. Thereafter, the stack was subjected to an autoclave curing process at a pressure of 0.7 MPa and a temperature of 160° C. for 8 hours.

In the above-described manner, the inorganic board according to Sample 1 having a thickness of 16 mm was produced. Of the total thickness of the inorganic board of Sample 1, the thickness of the core layer accounts for 70%, the thickness of the front layer accounts for 15%, and the thickness of the back layer accounts for 15%.

Sample 2

The inorganic board of Sample 2 having a thickness of 16 mm was produced in the same manner as the inorganic board of Sample 1 except that in forming a mixture mat for forming a front layer, the amount of deposition of the second raw material mixture for forming the front layer was increased by 100%, and that the mixture mat for forming a back layer was not formed on the mixture mat for forming a core layer. Of the total thickness of the inorganic board of Sample 2, the thickness of the core layer accounts for 70%, and the thickness of the front layer accounts for 30%.

Sample 3

The first raw material mixture was deposited on a template by scattering to form a mixture mat for forming a core layer. Next, the mixture mat was subjected to a stack pressing process at a pressure of 3 MPa, and while being in this pressed state, the stack was subjected to a steam curing process at a temperature of 60° C. for 6 hours. Thereafter, the stack was subjected to an autoclave curing process at a pressure of 0.7 MPa and a temperature of 160° C. for 8 hours. In this manner, the inorganic board according to Sample 3 having a thickness of 16 mm was produced.

Sample 4

The inorganic board of Sample 4 (thickness: 16 mm) was produced in the same manner as the inorganic board of Sample 1 except that in producing a first raw material mixture for forming a core layer, a higher fatty acid was used as a waterproofing agent in place of the acrylic resin.

Sample 5

The inorganic board of Sample 5 (thickness: 16 mm) was produced in the same manner as the inorganic board of Sample 1 except that in producing a first raw material mixture for forming a core layer, a predetermined amount of microspheres (having a particle size D50 of 0.1 mm and an acrylic resin shell) was used as a hollow body in place of the expanded polystyrene beads, and the amount of fly ash was changed.

Sample 6

The inorganic board of Sample 6 (thickness: 16 mm) was produced in the same manner as the inorganic board of Sample 1 except that in producing a first raw material mixture for forming a core layer, a predetermined amount of pearlite (having a particle size D50 of 0.3 mm) was used as a hollow body in place of the expanded polystyrene beads, and the amount of fly ash was changed.

Sample 7

In producing a first raw material mixture, wood chips serving as organic reinforcement materials and an acrylic resin serving as a waterproofing agent were first mixed together. Next, the mixture thus obtained and expanded polystyrene beads serving as hollow bodies were mixed together. Next, the mixture thus obtained and water were mixed together. Next, the mixture thus obtained, high-early-strength cement serving as a hydraulic material, fly ash serving as a siliceous material, and mica and pulverized inorganic board remnants serving as admixtures were mixed together.

The wood chips, acrylic resin, expanded polystyrene beads, high-early-strength cement, fly ash, mica, and pulverized inorganic board remnants used to produce the first raw material mixture of Sample 7 are the same as those used for the first raw material mixture of Sample 1.

In the above-described manner, the first raw material mixture of Sample 7 was produced. The inorganic board of Sample 7 (thickness: 16 mm) was produced in the same manner as the inorganic board of Sample 1 except that the first raw material mixture of Sample 7 was used in place of the first raw material mixture described above in relation to Sample 1.

Sample 8

In producing a first raw material mixture, wood chips serving as organic reinforcement materials and an acrylic resin serving as a waterproofing agent were first mixed together. Next, the mixture thus obtained and water were mixed together. Next, the mixture thus obtained, high-early-strength cement serving as a hydraulic material, fly ash serving as a siliceous material, and mica and pulverized inorganic board remnants serving as admixtures were mixed together. Next, the mixture thus obtained and expanded polystyrene beads serving as hollow bodies were mixed together.

The wood chips, acrylic resin, high-early-strength cement, fly ash, mica, pulverized inorganic board remnants, and expanded polystyrene beads used to produce the first raw material mixture of Sample 8 are the same as those used to produce the first raw material mixture of Sample 1.

In the above-described manner, the first raw material mixture of Sample 8 was produced. The inorganic board of Sample 8 (thickness: 16 mm) was produced in the same manner as the inorganic board of Sample 1 except that the first raw material mixture of Sample 8 was used in place of the first raw material mixture described above in relation to Sample 1.

Sample 9

The inorganic board of Sample 9 (thickness: 16 mm) was produced in the same manner as the inorganic board of Sample 1 except that a first raw material mixture for Sample 9 was used as a first raw material mixture for forming a core layer in place of the first raw material mixture for Sample 1. The first raw material mixture for Sample 9 was produced in the same manner as the first raw material mixture for Sample 1 except that the expanded polystyrene beads serving as hollow bodies were not used, the amounts of fly ash serving as a siliceous material and wood chips serving as organic reinforcement materials were changed, and a higher fatty acid was used as a waterproofing agent in place of the acrylic resin.

The higher fatty acid used to produce the first raw material mixture of Sample 9 is the same as the higher fatty acid used to produce the second raw material mixture of Sample 1.

Sample 10

The inorganic board of Sample 10 (thickness: 16 mm) was produced in the same manner as the inorganic board of Sample 9 except that the amount of deposition of the second raw material mixture for forming a front layer, the amount of deposition of the first raw material mixture for forming a core layer, and the amount of deposition of the second raw material mixture for forming a back layer were each decreased by 7.4%, and the pressure in stack pressing was changed from 3 MPa to 2 MPa.

<Specific Strength>

A test piece (7 cm×20 cm) was cut out from each of the inorganic boards of Samples 1 to 10, and the test piece was measured for bending strength (N/mm$^2$) in accordance with JIS A 1408. For each inorganic board, the value of bending strength (N/mm$^2$) was divided by a separately measured value of specific gravity (bulk specific gravity in absolute dry condition) to determine the specific strength of the inorganic board. The specific strength thus determined is shown in Tables 1 and 2 together with the specific gravity.

<Freeze-Thaw Resistance>

Each of the inorganic boards of Samples 1 to 10 was examined for freeze-thaw resistance by the method of freezing in air and thawing in water described in JIS A 1435. The thickness change (%) after 100 cycles, the thickness change (%) after 200 cycles, and the thickness change (%) after 300 cycles of the inorganic boards subjected to the method of freezing in air and thawing in water are shown in Tables 1 and 2.

<Dimensional Stability>

A test piece cut out from each of the inorganic boards of Samples 1 to 10 was first brought into an equilibrium state in a constant temperature chamber at 60° C. and then measured for full length (initial length). Next, the test piece was allowed to sit in water for 8 days. Next, the test piece taken out of the water was measured for full length (post-test length) after surface-adhering water was wiped off using a wet compress. For the test piece, the rate of dimensional change from the initial length to the post-test length (the rate of dimensional change after 8-day water absorption) was determined. The results are shown in Tables 1 and 2.

Another test piece cut out from each of the inorganic boards of Samples 1 to 10 was first brought into an equilibrium state in a constant temperature and humidity chamber at a temperature of 20° C. and a humidity of 65% and then measured for full length (initial length). Next, the test piece was allowed to sit in a drying machine with an inside temperature of 80° C. for 10 days. Next, the test piece taken out of the drying machine was measured for full length (post-test length). For the test piece, the rate of dimensional change from the initial length to the post-test length (the rate of dimensional change after 10-day moisture desorption) was determined. The results are shown in Tables 1 and 2.

<Burning Shrinkage>

A test piece (7 cm×20 cm) was cut out from each of the inorganic boards of Samples 1 to 10, and the test piece was subjected to a burning test to examine its post-test shrinkage. In the burning test, the test piece was heated at 900° C. for 1 hour in an electric furnace. The results are shown in Tables 1 and 2.

Evaluations

The inorganic board of Sample 9 (whose thickness is 16 mm, which is the same as those of Sample 1 to 8) in which no hollow body is present in the core layer has a high specific gravity and is heavy. In the inorganic board of Sample 10, which has the same configuration as that of the inorganic board of Sample 9 except that the net specific gravity is reduced by decreasing the amount of deposition of each raw material mixture and reducing the pressure in stack pressing in the production process, neither high specific strength nor high freeze-thaw resistance is not achieved. By contrast, in the inorganic boards of Sample 1 to 8, each including a core layer having a configuration in which an organic reinforcement material to which a hollow body is attached is dispersed in an inorganic cured matrix, high specific strength and high freeze-thaw resistance as well as weight reduction are achieved.

TABLE 1

|  |  |  | Sample 1 | Sample 2 | Sample 3 | Sample 4 | Sample 5 |
|---|---|---|---|---|---|---|---|
| Front layer/ back layer | Hydraulic material | High-early-strength cement | 35 | 35 | — | 35 | 35 |
|  | Siliceous material | Fly ash | 35 | 35 | — | 35 | 35 |
|  | Organic reinforcement material | Wood chips (12 mm or less) | 15 | 15 | — | 15 | 15 |
|  | Waterproofing agent | Higher fatty acid | 0.3 | 0.3 | — | 0.3 | 0.3 |
|  | Admixture | Mica | 5 | 5 | — | 5 | 5 |
|  |  | Pulverized inorganic board remnants | 9.7 | 9.7 | — | 9.7 | 9.7 |
| Core layer | Hydraulic material | High-early-strength cement | 30 | 30 | 30 | 30 | 30 |
|  | Siliceous material | Fly ash | 35 | 35 | 35 | 35 | 35.6 |
|  | Organic reinforcement material | Wood chips (20 mm or less) | 13 | 13 | 13 | 13 | 13 |
|  | Hollow body | Expanded polystyrene beads | 1 | 1 | 1 | 1 | — |
|  |  | Microspheres | — | — | — | — | 0.4 |
|  |  | Pearlite | — | — | — | — | — |
|  | Waterproofing agent | Acrylic resin | 0.3 | 0.3 | 0.3 | — | 0.3 |
|  |  | Higher fatty acid | — | — | — | 0.3 | — |
|  | Admixture | Mica | 5 | 5 | 5 | 5 | 5 |
|  |  | Pulverized inorganic board remnants | 15.7 | 15.7 | 15.7 | 15.7 | 15.7 |
| Layer structure |  | Front layer (%) | 15 | 30 | — | 15 | 15 |
|  |  | Core layer (%) | 70 | 70 | 100 | 70 | 70 |
|  |  | Back layer (%) | 15 | — | — | 15 | 15 |
| Specific gravity (bulk specific gravity in absolute dry condition) |  |  | 1.00 | 0.98 | 1.01 | 1.02 | 1.01 |
| Specific strength (bending strength/specific gravity) |  |  | 10.3 | 10.4 | 13.5 | 10.9 | 10.7 |
| Freeze-thaw resistance | Thickness change (%) after 100 cycles |  | 0.2 | 0.3 | 0.1 | 0.3 | 0.1 |
|  | Thickness change (%) after 200 cycles |  | 0.4 | 0.4 | 0.1 | 1.0 | 0.2 |
|  | Thickness change (%) after 300 cycles |  | 1.0 | 1.0 | 0.9 | 3.8 | 0.7 |
| Dimensional stability | Rate (%) of dimensional change after 8-day water absorption |  | 0.11 | 0.12 | 0.12 | 0.09 | 0.10 |
|  | Rate (%) of dimensional change after 10-day moisture desorption |  | 0.09 | 0.11 | 0.09 | 0.09 | 0.10 |
|  | Burning shrinkage (%) |  | 3.5 | 3.7 | 3.6 | 3.4 | 3.2 |

TABLE 2

|  |  |  | Sample 6 | Sample 7 | Sample 8 | Sample 9 | Sample 10 |
|---|---|---|---|---|---|---|---|
| Front layer/ back layer | Hydraulic material | High-early-strength cement | 35 | 35 | 35 | 35 | 35 |
|  | Siliceous material | Fly ash | 35 | 35 | 35 | 35 | 35 |
|  | Organic reinforcement material | Wood chips (12 mm or less) | 15 | 15 | 15 | 15 | 15 |
|  | Waterproofing agent | Higher fatty acid | 0.3 | 0.3 | 0.3 | 0.3 | 0.3 |
|  | Admixture | Mica | 5 | 5 | 5 | 5 | 5 |
|  |  | Pulverized inorganic board remnants | 9.7 | 9.7 | 9.7 | 9.7 | 9.7 |
| Core layer | Hydraulic material | High-early-strength cement | 30 | 30 | 30 | 30 | 30 |
|  | Siliceous material | Fly ash | 35 | 35 | 35 | 37 | 37 |
|  | Organic reinforcement material | Wood chips (20 mm or less) | 13 | 13 | 13 | 12 | 12 |
|  | Hollow body | Expanded polystyrene beads | — | 1 | 1 | — | — |
|  |  | Microspheres | — | — | — | — | — |
|  |  | Pearlite | 3 | — | — | — | — |
|  | Waterproofing agent | Acrylic resin | 0.3 | 0.3 | 0.3 | — | — |
|  |  | Higher fatty acid | — | — | — | 0.3 | 0.3 |
|  | Admixture | Mica | 5 | 5 | 5 | 5 | 5 |
|  |  | Pulverized inorganic board remnants | 15.7 | 15.7 | 15.7 | 15.7 | 15.7 |

TABLE 2-continued

|  |  | Sample 6 | Sample 7 | Sample 8 | Sample 9 | Sample 10 |
|---|---|---|---|---|---|---|
| Layer structure | Front layer (%) | 15 | 15 | 15 | 15 | 15 |
|  | Core layer (%) | 70 | 70 | 70 | 70 | 70 |
|  | Back layer (%) | 15 | 15 | 15 | 15 | 15 |
| Specific gravity (bulk specific gravity in absolute dry condition) |  | 1.04 | 1.01 | 1.02 | 1.08 | 1.03 |
| Specific strength (bending strength/specific gravity) |  | 11.4 | 11.1 | 12.0 | 10.6 | 9.2 |
| Freeze-thaw resistance | Thickness change (%) after 100 cycles | 0.7 | 0.3 | 0.5 | 0.3 | 1.2 |
|  | Thickness change (%) after 200 cycles | 1.2 | 0.7 | 1.1 | 0.7 | 3.9 |
|  | Thickness change (%) after 300 cycles | 2.8 | 2.1 | 3.7 | 2.0 | 6.8 |
| Dimensional stability | Rate (%) of dimensional change after 8-day water absorption | 0.10 | 0.11 | 0.11 | 0.10 | 0.10 |
|  | Rate (%) of dimensional change after 10-day moisture desorption | 0.09 | 0.09 | 0.09 | 0.09 | 0.10 |
|  | Burning shrinkage (%) | 3.1 | 3.5 | 14 | 3.4 | 4.1 |

REFERENCE SIGNS LIST

X1, X2, X3 inorganic board
11, 12, 13 cured layer

The invention claimed is:

1. A method for producing an inorganic board, comprising:
    a first step of preparing a first mixture through mixing of an organic reinforcement material and a hollow body smaller than a maximum length of the organic reinforcement material so that the hollow body is attached to the organic reinforcement material;
    a second step of preparing a second mixture through mixing of the first mixture, a hydraulic material, and a siliceous material; and
    a third step of forming a second mixture mat by depositing the second mixture, wherein the hollow body has a median size (diameter D50) of 0.05 mm to 2 mm.

2. The method for producing an inorganic board according to claim 1, wherein in the first step, the first mixture is prepared by mixing the organic reinforcement material mixed with a waterproofing agent with the hollow body.

3. The method for producing an inorganic board according to claim 2, wherein the waterproofing agent contains a synthetic resin.

4. The method for producing an inorganic board according to claim 1, wherein in the first step, the first mixture is prepared by mixing the organic reinforcement material with the hollow body, and then mixing the organic reinforcement material and the hollow body with a waterproofing agent.

5. The method for producing an inorganic board according to claim 4, wherein the waterproofing agent contains a synthetic resin.

6. The method for producing an inorganic board according to claim 1, further comprising:
    a fourth step of preparing a third mixture through mixing of a hydraulic material, a siliceous material, and an organic reinforcement material; and
    at least one fifth step of forming a third mixture mat by depositing the third mixture,
    wherein the organic reinforcement material in the third mixture is smaller than the organic reinforcement material in the second mixture, and
    the fifth step is performed after the third step to form the third mixture mat on the second mixture mat,
    the third step is performed after the fifth step to form the second mixture mat on the third mixture mat, or
    the third step is performed after the fifth step to form the second mixture mat on the third mixture mat, and the fifth step is further performed to form another third mixture mat on the second mixture mat.

7. The method for producing an inorganic board according to claim 6, wherein in the fourth step, the third mixture is prepared by mixing the organic reinforcement material mixed with a waterproofing agent containing a fatty acid with the hydraulic material and the siliceous material.

* * * * *

UNITED STATES PATENT AND TRADEMARK OFFICE
CERTIFICATE OF CORRECTION

PATENT NO. : 11,331,879 B2
APPLICATION NO. : 16/824257
DATED : May 17, 2022
INVENTOR(S) : Yasuhiro Takamura et al.

Page 1 of 1

It is certified that error appears in the above-identified patent and that said Letters Patent is hereby corrected as shown below:

On the Title Page

In the Assignee, item (73):
Please change:
"(73) Assignee: NICHTHA CORPORATION, Nagoya (JP)"

To:
--(73) Assignee: NICHIHA CORPORATION, Nagoya-Shi (JP)--

Signed and Sealed this
Twenty-seventh Day of September, 2022

Katherine Kelly Vidal
*Director of the United States Patent and Trademark Office*